(12) United States Patent
Bu

(10) Patent No.: US 12,512,553 B2
(45) Date of Patent: Dec. 30, 2025

(54) SECONDARY BATTERY

(71) Applicant: CONTEMPORARY AMPEREX TECHNOLOGY (HONG KONG) LIMITED, Hong Kong (CN)

(72) Inventor: Xiangyan Bu, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 597 days.

(21) Appl. No.: 17/489,681

(22) Filed: Sep. 29, 2021

(65) Prior Publication Data

US 2022/0021069 A1 Jan. 20, 2022

Related U.S. Application Data

(63) Continuation of application No. PCT/CN2020/108180, filed on Aug. 10, 2020.

(30) Foreign Application Priority Data

Aug. 14, 2019 (CN) .......................... 201910749321.4

(51) Int. Cl.
H01M 50/183 (2021.01)
H01M 50/103 (2021.01)
(Continued)

(52) U.S. Cl.
CPC ....... H01M 50/317 (2021.01); H01M 50/103 (2021.01); H01M 50/15 (2021.01);
(Continued)

(58) Field of Classification Search
CPC ............. H01M 50/184; H01M 50/186; H01M 50/3425; H01M 50/474; H01M 50/477;
(Continued)

(56) References Cited

U.S. PATENT DOCUMENTS 6,204,635 B1 * 3/2001 Sullivan .............. H01M 50/574
320/147
2006/0024568 A1 * 2/2006 Lee ..................... H01M 50/477
429/186
(Continued)

FOREIGN PATENT DOCUMENTS

CN 102088103 A 6/2011
CN 102447128 A 5/2012
(Continued)

OTHER PUBLICATIONS

Johnson and Pennington, "Concave in Geometry | Definition, Shapes & Functions", Study.com (Year: 2023).*
(Continued)

Primary Examiner — Jessie Walls-Murray
(74) Attorney, Agent, or Firm — East IP P.C.

(57) ABSTRACT

This disclosure provides a secondary battery, including: a case including an opening; an electrode assembly disposed within the case and including a main body and two tabs, the two tabs being both disposed facing the case; and a cap assembly including a cap plate, a lower insulating member and an explosion-proof valve, the cap plate sealing the opening, the explosion-proof valve being disposed on the cap plate, the lower insulating member being disposed on a side of the cap plate close to the electrode assembly, the lower insulating member including an inner side surface facing the main body, an outer side surface facing the cap plate, and a concave portion recessed from the inner side surface toward the outer side surface, the concave portion being in position corresponding to the explosion-proof valve, and the concave portion being used to buffer expansion and deformation of the main body.

12 Claims, 9 Drawing Sheets

(51) Int. Cl.
  *H01M 50/15* (2021.01)
  *H01M 50/184* (2021.01)
  *H01M 50/186* (2021.01)
  *H01M 50/317* (2021.01)
  *H01M 50/342* (2021.01)
  *H01M 50/474* (2021.01)
  *H01M 50/477* (2021.01)
  *H01M 50/55* (2021.01)
  *H01M 50/593* (2021.01)
  *H01M 50/636* (2021.01)

(52) U.S. Cl.
  CPC ....... *H01M 50/183* (2021.01); *H01M 50/184* (2021.01); *H01M 50/186* (2021.01); *H01M 50/3425* (2021.01); *H01M 50/474* (2021.01); *H01M 50/477* (2021.01); *H01M 50/55* (2021.01); *H01M 50/593* (2021.01); *H01M 50/636* (2021.01); *H01M 2200/00* (2013.01)

(58) Field of Classification Search
  CPC .. H01M 50/55; H01M 50/636; H01M 50/317; H01M 50/103; H01M 50/15; H01M 50/183; H01M 50/593; H01M 2200/00; H01M 50/193; H01M 50/30; H01M 50/148; H01M 50/20; H01M 50/188; H01M 50/143
  See application file for complete search history.

(56) References Cited

U.S. PATENT DOCUMENTS

| | | | |
|---|---|---|---|
| 2006/0099504 A1* | 5/2006 | Kim | H01M 10/0587 29/623.1 |
| 2009/0186269 A1* | 7/2009 | Kim | H01M 50/553 429/179 |
| 2012/0064380 A1* | 3/2012 | Kim | H01M 50/103 429/66 |
| 2012/0064389 A1 | 3/2012 | Uh | |
| 2013/0273415 A1 | 10/2013 | Lee et al. | |
| 2014/0106207 A1 | 4/2014 | Kim et al. | |
| 2014/0127538 A1 | 5/2014 | Uruno et al. | |
| 2014/0377640 A1 | 12/2014 | Takenouchi et al. | |
| 2015/0104677 A1 | 4/2015 | Koh | |
| 2017/0040575 A1* | 2/2017 | Bang | H01M 50/184 |
| 2017/0222209 A1 | 8/2017 | Hattori et al. | |
| 2017/0352845 A1 | 12/2017 | Li et al. | |
| 2018/0076440 A1 | 3/2018 | Yoshida et al. | |
| 2018/0166676 A1* | 6/2018 | Xing | H01M 50/593 |
| 2018/0183035 A1 | 6/2018 | Hirose et al. | |
| 2018/0261806 A1 | 9/2018 | Kawate et al. | |
| 2019/0207185 A1* | 7/2019 | Lee | H01M 50/529 |
| 2019/0221790 A1 | 7/2019 | Xing | |
| 2020/0052265 A1 | 2/2020 | Wakimoto et al. | |
| 2021/0280952 A1* | 9/2021 | Wakimoto | H01M 50/15 |
| 2022/0255200 A1* | 8/2022 | Yamamoto | H01M 50/538 |

FOREIGN PATENT DOCUMENTS

| | | |
|---|---|---|
| CN | 202888254 U | 4/2013 |
| CN | 103137910 A | 6/2013 |
| CN | 103383997 A | 11/2013 |
| CN | 103650202 A | 3/2014 |
| CN | 104103853 A | 10/2014 |
| CN | 104205422 | 12/2014 |
| CN | 104347827 A | 2/2015 |
| CN | 204760444 U | 11/2015 |
| CN | 105374955 A | 3/2016 |
| CN | 105518904 A | 4/2016 |
| CN | 205723710 U | 11/2016 |
| CN | 106601940 | 4/2017 |
| CN | 107210494 A | 9/2017 |
| CN | 107534115 A | 1/2018 |
| CN | 107732129 A | 2/2018 |
| CN | 207038571 U | 2/2018 |
| CN | 108428852 A | 8/2018 |
| CN | 207800666 | 8/2018 |
| CN | 208062179 U | 11/2018 |
| CN | 109075286 A | 12/2018 |
| CN | 208489243 U | 2/2019 |
| CN | 109417134 A | 3/2019 |
| CN | 110021727 A | 7/2019 |
| CN | 209183613 U | 7/2019 |
| CN | 111029488 A | 4/2020 |
| CN | 111029489 A | 4/2020 |
| JP | 2017098207 A | 6/2017 |
| JP | 2017157342 A | 9/2017 |
| JP | 2018055893 A | 4/2018 |
| JP | 2018056084 A | 4/2018 |
| JP | 2018063854 | 4/2018 |
| JP | 2019133854 A | 8/2019 |
| WO | 2018079423 A1 | 5/2018 |

OTHER PUBLICATIONS

The Florida Center for Instructional Technology, College of Education, University of South Florida; ClipArt ETC is a part of the Educational Technology Clearinghouse. From <https://etc.usf.edu/clipart/42000/42023/pro_120_42023.htm> and <https://etc.usf.edu/clipart/42000/42033/pro_170_42033.htm> (Year: 2024).*
PCT International Search Report for PCT/CN2020/108180, dated Nov. 11, 2020, 12 pages.
The First Office Action for China Application No. 201910749321.4, dated Mar. 15, 2021, 21 pages.
The Notification Grant for China Application No. 201910749321.4, dated May 24, 2021, 7 pages.
The extended European search report for EP Application No. 20853251.5, dated Feb. 25, 2022, 7 pages.
The First Office Action for China Application No. 201910749967.2, dated Mar. 1, 2021, 17 pages.
The notification to grant for China Application No. 201910749967.2, dated Jul. 22, 2021, 7 pages.
The International search report for PCT Application No. PCT/CN2020/108202, dated Nov. 11, 2020, 12 pages.
The Non Final Rejection for the U.S. Appl. No. 17/471,205, dated Mar. 26, 2024, 33 pages.
The Final Office Action for the U.S. Appl. No. 17/471,205, dated Sep. 20, 2024, 32 pages.

* cited by examiner

SECONDARY BATTERY

CROSS-REFERENCE TO RELATED APPLICATION

This application is a continuation of International Application No. PCT/CN2020/108180, filed on Aug. 10, 2020, which claims priority of Chinese patent application No. 201910749321.4, entitled "SECONDARY BATTERY" and filed on Aug. 14, 2019, the entirety of which is incorporated herein by reference.

TECHNICAL FIELD

The present disclosure relates to the technical field of the battery, and in particular to a secondary battery.

BACKGROUND

With development of science and technology, secondary batteries have been widely used in portable electronic devices such as mobile phones, digital cameras, and laptop computers, have broad application prospects in electric traffic tools such as electric vehicles and electric bicycles and in large and medium-sized electric appliances such as energy storage facilities, and have become important technical means to solve global problems such as energy crisis and environmental pollution. The secondary battery includes a case, an electrode assembly housed within the case, and a cap assembly sealingly connected with the case. The cap assembly includes a cap plate, an explosion-proof valve disposed on the cap plate, and a lower insulating member disposed below the cap plate. The lower insulating member can prevent a short circuit between the electrode assembly and the cap plate. However, during charging and discharging, the electrode assembly may expand and is thus very prone to cause deformation of the lower insulating member. The deformed lower insulating member will squeeze the explosion-proof valve, thereby affecting the preset burst pressure of the explosion-proof valve, resulting in presence of potential safety hazards in the secondary battery.

SUMMARY

An embodiment of the present disclosure provides a secondary battery that can buffer the expansion of the electrode assembly by the lower insulating member, resulting in the lower insulating member itself being not prone to deform to squeeze the explosion-proof valve, ensuring the preset bursting pressure of the explosion-proof valve being maintained in a normal state, improving the safety of secondary battery in use.

In one aspect, an embodiment of the present disclosure provides a secondary battery including: a case including an opening; an electrode assembly disposed within the case, the electrode assembly including a main body and two tabs, the two tabs respectively extending outwards from both sides of the main body in an axial direction of the main body, the two tabs being both disposed facing the case; and a cap assembly including a cap plate, a lower insulating member and an explosion-proof valve, the cap plate sealing the opening, the explosion-proof valve being disposed on the cap plate, the lower insulating member being disposed on a side of the cap plate close to the electrode assembly, the lower insulating member including an inner side surface facing the main body, an outer side surface facing the cap plate, and a concave portion recessed from the inner side surface toward the outer side surface, the concave portion being in position corresponding to the explosion-proof valve, and the concave portion being used to buffer expansion and deformation of the main body.

According to the above-mentioned embodiment of the present disclosure, the concave portion includes a first inclined surface and a second inclined surface which are distributed along the axial direction, the first inclined surface and the second inclined surface are both inclined from the inner side surface toward the outer side surface, the explosion-proof valve is located between the first inclined surface and the second inclined surface, and the first inclined surface and the second inclined surface become close to each other in a direction from the inner side surface to the outer side surface.

According to the above-mentioned embodiment of the present disclosure, the first inclined surface is in arc transition with the inner side surface; and/or, the second inclined surface is in arc transition with the inner side surface.

According to any one of the above-mentioned embodiments of the present disclosure, the first inclined surface and the second inclined surface are symmetrically disposed along an axis of the concave portion.

According to the above-mentioned embodiment of the present disclosure, the first inclined surface and the inner side surface are both flat surfaces, and an angle formed between the first inclined surface and the inner side surface is from 120° to 170°; and/or, the second inclined surface and the inner side surface are flat surfaces, and an angle formed between the second inclined surface and the inner side surface is from 120° to 170°.

According to any one of the above-mentioned embodiments of the present disclosure, a portion of the lower insulating member corresponding to the first inclined surface has a thickness that gradually decreases, in a direction approaching the explosion-proof valve; and/or, a portion of the lower insulating member corresponding to the second inclined surface has a thickness that gradually decreases, in the direction approaching the explosion-proof valve.

According to any one of the above-mentioned embodiments of the present disclosure, the cap plate includes a liquid injection hole, and the liquid injection hole is located on a side of the explosion-proof valve along the axial direction, and the first inclined surface or the second inclined surface does not exceed an edge of the liquid injection hole close to the explosion-proof valve.

According to the above-mentioned embodiment of the present disclosure, the cap plate includes a convex portion protruding toward the lower insulating member, the liquid injection hole penetrates the convex portion, and the lower insulating member includes a groove recessed from the outer side surface toward the inner side surface and an through hole that is in communication with the groove, the convex portion is inserted into the groove, and the liquid injection hole is disposed corresponding to the through hole, and the first inclined surface or the second inclined surface does not exceed an edge of the groove closed to the explosion-proof valve.

According to any one of the above-mentioned embodiments of the present disclosure, the lower insulating member includes a first insulating plate and a second insulating plate which are spaced apart from each other along the axial direction, the first inclined surface is disposed on the first insulating plate, the first inclined surface connects a first end surface of the first insulating plate facing the second insulating plate with the inner side surface, the second inclined surface is disposed on the second insulating plate, the second inclined surface connects a second end surface of the second insulating plate facing the first insulating plate with the inner side surface, an avoidance gap that is in communication with the concave portion is formed between the first end surface and the second end surface.

According to the above-mentioned embodiment of the present disclosure, a connecting column is provided between the first insulating plate and the cap plate, the first insulating plate is connected and fixed to the cap plate by the connecting column; and/or, the connecting column is provided between the second insulating plate and the cap plate, and the second insulating plate is connected and fixed to the cap plate by the connecting column.

According to any one of the above-mentioned embodiments of the present disclosure, the lower insulating member is formed of an integral structural body and includes an avoidance hole that is in communication with the concave portion, the avoidance hole is in position corresponding to the explosion-proof valve, the first inclined surface and the second inclined surface are connected along the axial direction.

During use of the secondary battery according to the embodiment of the present disclosure, the main body of the electrode assembly may expand. A portion of the main body facing the opening of the case will expand toward a direction approaching the lower insulating member. Since the concave portion is disposed on a portion of the lower insulating member corresponding to the explosion-proof valve, when the main body expands, the expansion of the main body will be at least partially absorbed and buffered by the concave portion, so the expanding main body will not come into contact with the lower insulating member or will not exert a relatively large compressive stress on the lower insulating member, at the concave portion. In this way, during the charging and discharging, the possibility of deformation of the lower insulating member due to being squeezed by the expanding main body can be reduced, thereby the possibility of affecting the original preset burst pressure of the explosion-proof valve due to the deformation of the lower insulating member to squeeze the explosion-proof valve can be reduced, and the safety of the secondary battery in use can be improved.

DESCRIPTION OF THE DRAWINGS

The features, advantages, and technical effects of the exemplary embodiments of the present disclosure will be described below with reference to the accompanying drawings.

Figure 1:
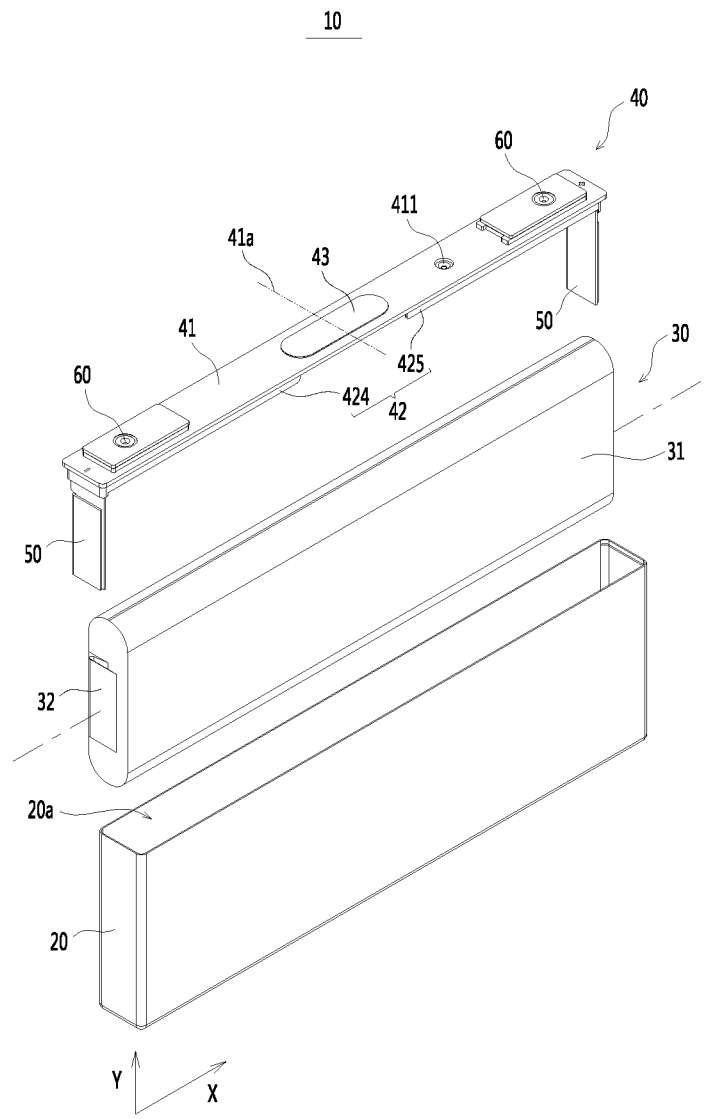
FIG. 1 is a schematic view of an exploded structure of a secondary battery according to an embodiment of the present disclosure.

In the drawings, the figures are not drawn to actual scale.

DESCRIPTION OF REFERENCE NUMERALS

10: secondary battery;
20: case; 20a: opening;
30: electrode assembly; 31: main body; 32: tab;
40: cap assembly; 41: cap plate; 41a: center line; 411: liquid injection hole; 412: convex portion; 42: lower insulating member; 421: inner side surface; 422: outer side surface; 423: concave portion; 423a: first inclined surface; 423b: second inclined surface; 424: first insulating plate; 424a: first end surface; 425: second insulating plate; 425a: second end surface; 426: accommodating portion; 427: groove; 428: through hole; 429: avoidance hole; 430: connecting column; 43: explosion-proof valve;
50: current collecting member; 51: connecting portion; 52: current collecting portion;
60: electrode terminal;
X: axial direction; Y: thickness direction.

DETAILED DESCRIPTION

The implementation of the present disclosure will be described in further detail below in conjunction with the accompanying drawings and embodiments. The detailed description of the following embodiments and drawings are used to exemplarily illustrate the principle of the present disclosure, rather than used to limit the scope of the present disclosure. That is, the present disclosure is not limited to the described embodiments.

In the description of the present disclosure, it should be stated, unless otherwise specified, "a plurality of" refers to two or more; and the directions or positional relationships indicated by the terms such as "upper", "lower", "left", "right", "inner", "outside" and the like, are only for the convenience of describing the present disclosure and simplifying the description, and do not mean or imply that the involved device or element must have a specific orientation or must be configured or operated in the specific orientation, therefore, they cannot be understood as limiting the present disclosure. In addition, the terms "first", "second" and the like are only used for descriptive purposes, and should not be interpreted as indicating or implying relative importance. The term "perpendicular" need not be strictly perpendicular, but allows for an allowable amount of error. The term "parallel" need not be strictly parallel, but allows for an allowable amount of error.

The orientation terms appearing in the following description refer to the directions shown in the drawings, and are not intended to limit the specific structure of the present disclosure. In the description of the present disclosure, it should also be stated, unless otherwise specified and limited, the terms "mounted", "connected to", "connected with" or the like should be understood in a broad sense. For example, a connection may refer to a fixed connection or a disassembly connection; or may refer to an integral connection; or may refer to a direct connection or an indirect connection through an intermediate medium. For the ordinary person skilled in the art, the specific meanings of the above terms in the present disclosure may be understood according to specific situations.

In order to better understand the present disclosure, the embodiments of the present disclosure will be described below in conjunction with FIGS. 1 to 11

Figure 2:
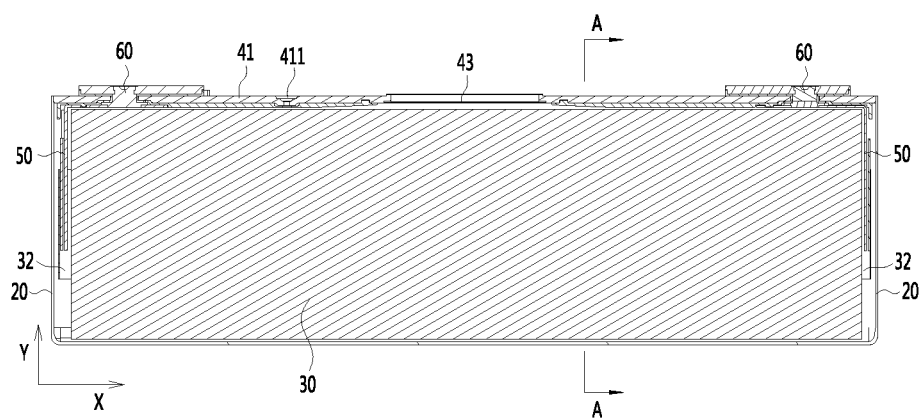
FIG. 2 is a schematic cross-sectional view of the secondary battery according to the embodiment shown in FIG. 1.
Figure 3:
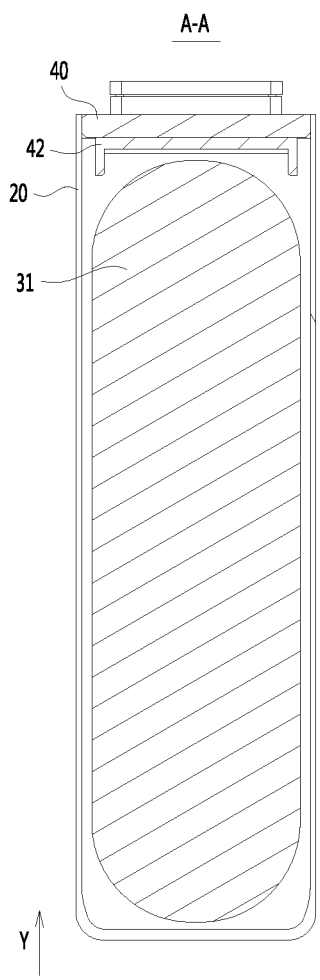
FIG. 3 is a cross-sectional view taken along A-A direction shown in FIG. 2.

Referring to FIGS. 1 to 3, a secondary battery 10 according to an embodiment of the present disclosure includes a case 20, an electrode assembly 30 disposed within the case 20, and a cap assembly 40 sealingly connected with the case 20.

The case 20 in the embodiment of the present disclosure is formed in a shape of square or in other shapes. The case 20 has an internal space where the electrode assembly 30 and the electrolyte are accommodated and an opening 20a which is in communication with the internal space. The case 20 may be made of a material such as aluminum, aluminum alloy, and plastic.

The electrode assembly 30 in the embodiment of the present disclosure has a main body 31 formed by stacking or winding a first electrode plate, a second electrode plate and a separator located between the first electrode plate and the second electrode plate together, wherein the separator is an insulating member interposed between the first electrode plate and the second electrode plate. The main body 31 in present embodiment as a whole is formed in a flat shape, and has a predetermined thickness, height, and width. An axial direction of the main body 31 is its own height direction. The main body 31 has two end surfaces opposed to each other in an axial direction X thereof. In the present embodiment, the description is made by exemplarily taking the first electrode plate as a positive electrode plate, and taking the second electrode plate as a negative electrode plate. Similarly, in other embodiments, the first electrode plate may be a negative electrode plate, and the second electrode plate is a positive electrode plate. Further, a positive active material is coated on a coating portion of the positive electrode plate, and a negative active material is coated on a coating portion of the negative electrode plate. The uncoated region extending outwards from the coated portion of the main body 31 serves as a tab 32. The electrode assembly 30 includes two tabs 32, namely a positive tab and a negative tab, wherein the positive tab extends outwards from the coated region of the positive electrode plate, and the negative tab extends outwards from the coated region of the negative electrode plate. The two tabs 32 extend outwards from two sides of the main body 31 in an axial direction X of the main body 31, respectively. Each of the tabs 32 extends outwards from each of the end surfaces of the main body 31, so the two tabs 32 are disposed opposite to each other in the axial direction X. The two end surfaces of the main body 31 and the two tabs 32 are disposed facing the case 20. The main body 31 has wide surfaces and narrow surfaces which are connected to each other and disposed alternatively with each other in a circumferential direction of the main body 31. Optionally, the narrow surface of the main body 31 faces the opening 20a of the case 20.

The cap assembly 40 in the embodiment of the present disclosure includes a cap plate 41, a lower insulating member 42 and an explosion-proof valve 43. The cap plate 41 is connected to the case 20 and seals the opening 20a of the case 20. The cap plate 41 includes a mounting hole for mounting the explosion-proof valve 43. The explosion-proof valve 43 is connected to the cap plate 41 and covers the mounting hole. Optionally, the explosion-proof valve 43 is formed in a sheet-like shape. The cap plate 41 includes a center line 41a that intersects an axis of the mounting hole. In the axial direction X, the regions of the explosion-proof valve 43 located on both sides of the center line 41a are symmetrically disposed. The lower insulating member 42 is disposed on a side of the cap plate 41 close to the electrode assembly 30. The lower insulating member 42 includes an inner side surface 421 facing the main body 31, an outer side surface 422 facing the cap plate 41, and a concave portion 423 recessed from the inner side surface 421 toward the outer side surface 422. The concave portion 423 and the explosion-proof valve 43 are in positions corresponding to each other and are spaced apart from the main body 31 by a predetermined distance. The concave portion 423 of the lower insulating member 42 is used to buffer the expansion and deformation of the main body 31. In an example, a projection of the explosion-proof valve 43 on the cap plate 41 is located within an outer contour of a projection of the concave portion 423 of the lower insulating member 42 on the cap plate 41.

The secondary battery 10 further includes an electrode terminal 60 disposed on the cap plate 41 and a current collecting member 50 connecting the electrode terminal 60 and the tab 32. The cap plate 41 is provided with two electrode terminals 60. Also there are two current collecting members 50. Each of the electrode terminals 60 is connected to a corresponding tab 32 through one current collecting member 50. The current collecting member 50 includes a connecting portion 51 connected and fixed to the electrode terminal 60 and a current collecting portion 52 connected with the tab 32. The connecting portion 51 is connected to a portion of the electrode terminal 60 close to the electrode assembly 30. The collecting portion 52 is at least partially located between the end surface of the main body 31 and the case 20 and is welded to the tab 32.

During use of the secondary battery 10 according to the embodiment of the present disclosure, the main body 31 of the electrode assembly 30 may expand. A portion of the main body 31 facing the opening 20a of the case 20 will expand toward a direction approaching the lower insulating member 42. Since the concave portion 423 is disposed on a portion of the lower insulating member 42 corresponding to the explosion-proof valve 43, when the main body 31 expands, the expansion of the main body 31 will be at least partially absorbed and buffered by the concave portion 423, so the expanding main body 31 will not come into contact with the lower insulating member 42 or will not exert a relatively large compressive stress on the lower insulating member 42, at the concave portion 423. In this way, during the charging and discharging, the possibility of deformation of the lower insulating member 42 due to being squeezed by the expanding main body 31 can be reduced, thereby the possibility of affecting the original preset burst pressure of the explosion-proof valve 43 due to the deformation of the lower insulating member 42 to squeeze the explosion-proof valve 43 can be reduced, and the safety of the secondary battery 10 in use can be improved. In addition, the concave portion 423 disposed on the lower insulating member 42 can increase the internal space of the secondary battery 10, so the concave portion 423 can accommodate a portion of the gas generated during the operation of the secondary battery 10, thereby reducing the pressure inside the secondary battery 10, and reducing the possibility of expanding of the secondary battery 10 as a whole.

Figure 4:
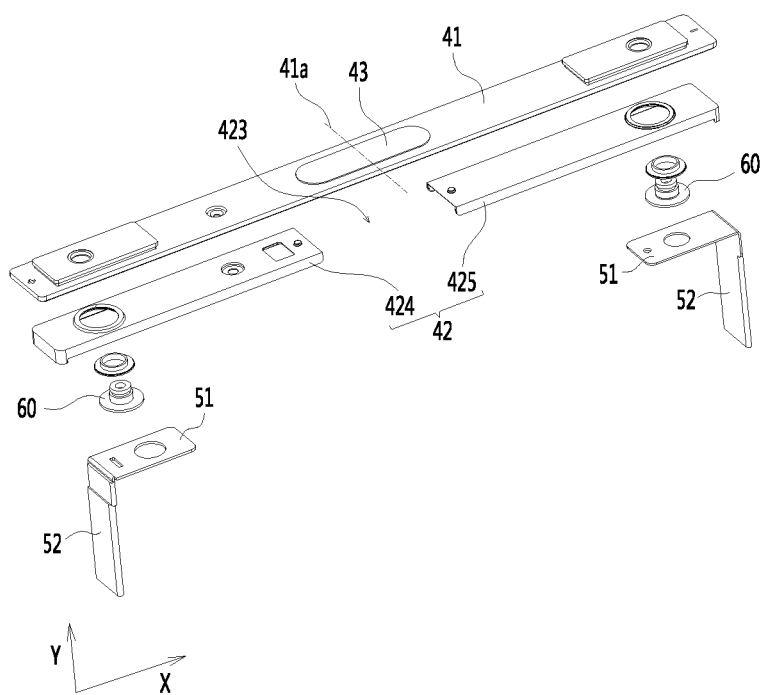
FIG. 4 is a schematic view of a partial exploded structure of a secondary battery according to an embodiment of the present disclosure.
Figure 5:
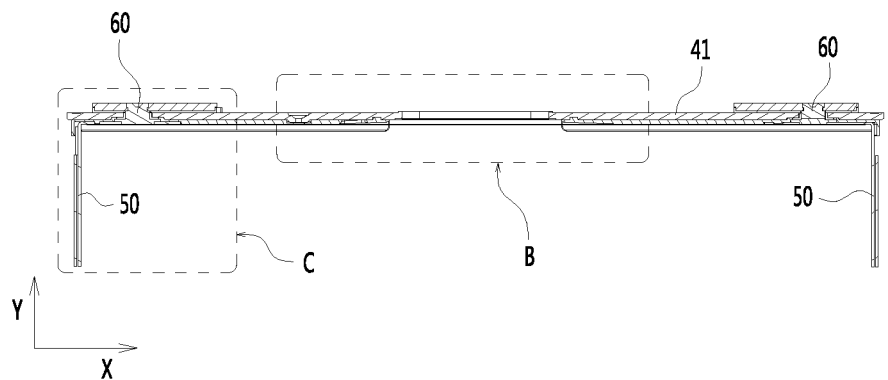
FIG. 5 is a schematic cross-sectional view of the secondary battery according to the embodiment shown in FIG. 4.

Referring to FIG. 4, the lower insulating member 42 includes a first insulating plate 424 and a second insulating plate 425 which are spaced apart from each other along the axial direction X. The first insulating plate 424 and the second insulating plate 425 are respectively located on both sides of the explosion-proof valve 43. An avoidance gap is formed between the first insulating plate 424 and the second insulating plate 425. The avoidance gap is in position corresponding to the explosion-proof valve 43, so the lower insulating member 42 avoids the explosion-proof valve 43 by the avoidance gap, thereby ensuring that the airflow can smoothly pass through the avoidance gap and can be discharged from the explosion-proof valve 43 when the pressure inside the secondary battery 10 exceeds the preset bursting stress of the explosion-proof valve 43. Furthermore, the lower insulating member 42 is prone to soften when in a high temperature environment. If no gap is provided on a region where the lower insulating member 42 directly faces the explosion-proof valve 43, the softened lower insulating member 42 will clung tightly to the periphery of the explosion-proof valve. 43, thereby affecting the preset bursting stress of the explosion-proof valve 43.

Referring to FIGS. 5 to 8, the concave portion 423 includes a first inclined surface 423 a and a second inclined surface 423b which are distributed along the axial direction X of the main body 31. Both the first inclined surface 423a and the second inclined surface 423b are inclined from the inner side surface 421 toward the outer side surface 422. The explosion-proof valve 43 is located between the first inclined surface 423a and the second inclined surface 423b. The first insulating plate 424 includes the inner side surface 421 and a first end surface 424a facing the second insulating plate 425. The first inclined surface 423a is disposed at the first insulating plate 424 and connects the inner side surface 421 with the first end surface 424a of the first insulating plate 424. The second insulating plate 425 includes the inner side surface 421 and a second end surface 425a facing the first insulating plate 424. The first end surface 424a and the second end surface 425a are spaced apart from each other to form the avoidance gap that is in communication with the concave portion 423. The second inclined surface 423b is disposed at the second insulating plate 425 and connects the inner side surface 421 with the second end surface 425a of the second insulating plate 425. The first inclined surface 423a and the second inclined surface 423b are close to each other in a direction from the inner side surface 421 to the outer side surface 422, that is, the distance between the first inclined surface 423 a and the second inclined surface 423b in the axial direction X of the main body 31 gradually decreases. In the present embodiment, for ease of description, a portion of the main body 31 corresponding to the inner side surface 421 is indicated as a first region, and a portion of the main body 31 corresponding to the concave portion 423 is indicated as a second region. After the main body 31 expands, the second region of the main body 31 will enter into the concave portion 423, and the second region of the main body 31 will come into contact with the first inclined surface 423a and the second inclined surface 423b, so the first inclined surface 423a and the second inclined surface 423b will exert a restraining force on the second region and reduce the expansion of the main body 31 to a certain extent. The first inclined surface 423a and the second inclined surface 423b have slopes, so when the first inclined surface 423a and the second inclined surface 423b each come into contact with the second region, no stress concentration will occur, reducing the possibility of partial structural damage to the second region being in the expanded state by the lower insulating member 42.

Figure 7:
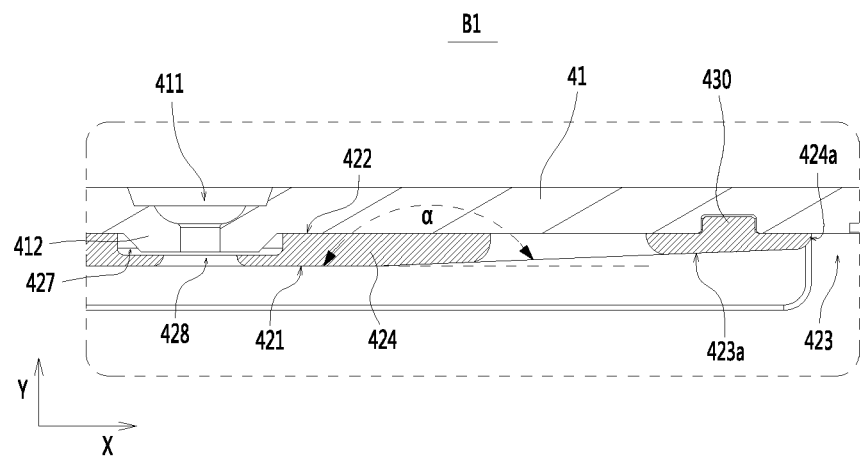
FIG. 7 is an enlarged view of portion B1 in FIG. 6.
Figure 8:
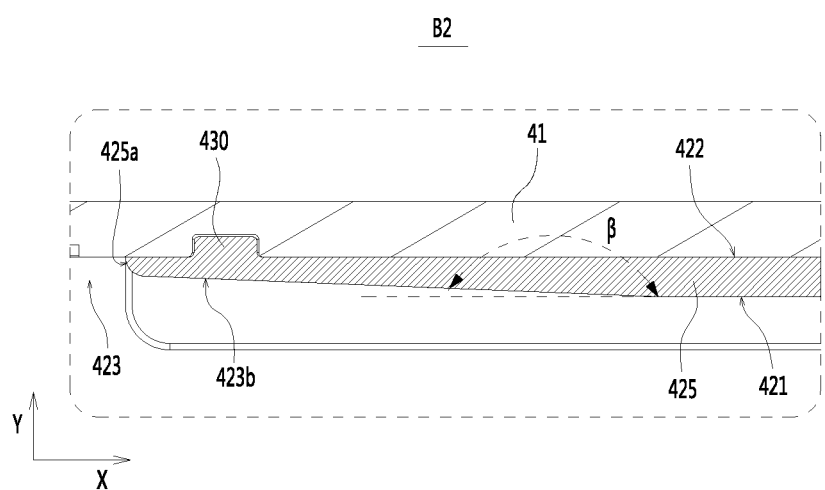
FIG. 8 is an enlarged view of portion B2 in FIG. 6.

In an example, referring to FIGS. 7 and 8, both the first inclined surface 423a and the second inclined surface 423b are in arc transition with the corresponding inner side surfaces 421, thereby reducing the sharpness of the transition region between the first inclined surface 423a and the inner side surface 421 and that of the transition region between the second inclined surface 423b and the inner side surface 421. The transition region between each of the first inclined surface 423a and the second inclined surface 423b and the corresponding inner side surface 421 is smooth and continuous. When the main body 31 expands, the first region is restrained by the inner side surface 421 of the lower insulating member 42, whereas the second region is not restrained by the inner side surface 421 of the lower insulating member 42, so the expansion degree of the first region is smaller than that of the second region, resulting in the expansion amount of the first region being different from that of the second region. Since both the first inclined surface 423a and the second inclined surface 423b are in arc transition with the inner side surface 421, the transition between the first region and the second region can be accordingly made smooth. Therefore, the transition region between the inner side surface 421 of the lower insulating member 42 and the first inclined surface 423a does not apply a relatively large shear stress to the main body 31 along a direction perpendicular to the axial direction X, effectively reducing the possibility of shear structural damage to the main body 31 due to being squeezed by the transition region between the inner side surface 421 of the lower insulating member 42 and the first inclined surface 423a and by the transition region between the inner side surface 421 and the second inclined surface 423b. The direction perpendicular to the axial direction X indicates the same direction as the thickness direction Y of the cap plate 41. The shear structural damage of the main body 31 includes cracks of the electrode plate or cracks of the separator. Optionally, the first inclined surface 423a is in arc transition with the first end surface 424a, and the second inclined surface 423b is in arc transition with the second end surface 425a, thereby reducing the sharpness of the transition region between the first inclined surface 423a and the first end surface 424a and that of the transition region between the second inclined surface 423b and the second end surface 425a. When the second region of the main body 31 has a large expansion amount enough to approach the first end surface 424a and the second end surface 425a, the transition region between the first inclined surface 423a and the first end surface 424a, as well as the transition region between the second inclined surface 423b and the second end surface 425a, does not apply a relatively large shear stress to the second region of the main body 31 along the direction perpendicular to the axial direction X, effectively reducing the possibility of shear structural damage to the second region of the main body 31 due to being squeezed by the transition region between the first inclined surface 423a and the first end surface 424a and by the transition region between the transition region between the second inclined surface 423b and the second end surface 425a. In other examples, the first inclined surface 423a or the second inclined surface 423b is in arc transition with the inner side surface 421. The first inclined surface 423a is in arc transition with the first end surface 424a, or the second inclined surface 423b is in arc transition with the second end surface 425a. In this way, the possibility of shear structural damage to the main body 31 due to being squeezed by the corresponding region of the lower insulating member 42 can be reduced.

In an example, the first inclined surface 423a and the second inclined surface 423b are symmetrically disposed along the axis of the concave portion 423, so the first inclined surface 423a and the second inclined surface 423b have the same structure, further ensuring that the expansion degree of the region where the main body 31 is in contact with the first inclined surface 423a is substantially same as that of the region where the main body 31 is in contact with the second inclined surface 423b, reducing the possibility of presence of uneven expansion in the second region of the main body 31.

In an example, as shown in FIG. 7, the first inclined surface 423a and the inner side surface 421 are both flat surfaces. Here, the flat surface refers to an approximately flat surface. An angle α formed between the first inclined surface 423a and the inner side surface 421 is from 120° to 170°. When the angle α formed between the first inclined surface 423a and the inner side surface 421 is less than 120°, the sharpness of the transition region between the first inclined surface 423a and the inner side surface 421 is still relatively large, and it is prone to apply a shear stress to the expanded main body 31 along the direction perpendicular to the axial direction X. When the angle α formed between the first inclined surface 423a and the inner side surface 421 is greater than 170°, the first inclined surface 423a is too close to the plane where the inner side surface 421 is located, resulting in a smaller depth of the concave portion 423 in the direction from the inner side surface 421 to the outer side surface 422, causing that the effect of buffering the expansion of the main body 31 cannot be achieved. In another example, as shown in FIG. 8, the second inclined surface 423b and the inner side surface 421 are flat surfaces. An angle β formed between the second inclined surface 423b and the inner side surface 421 is from 120° to 170°. Similarly, when the angle β formed between the second inclined surface 423b and the inner side surface 421 is less than 120°, the sharpness of the transition region between the second inclined surface 423b and the inner side surface 421 is still relatively large, and it is prone to apply a shear stress to the expanded main body 31 along the direction perpendicular to the axial direction X. When the angle β formed between the second inclined surface 423b and the inner side surface 421 is greater than 170°, the second inclined surface 423b is too close to the plane where the inner side surface 421 is located, resulting in a smaller depth of the concave portion 423 in the direction from the inner side surface 421 to the outer side surface 422 causing that the effect of buffering the expansion of the main body 31 cannot be achieved. Preferably, the angle α formed between the first inclined surface 423a and the inner side surface 421 and the angle β formed between the second inclined surface 423b and the inner side surface 421 are both 150°. Preferably, the first inclined surface 423a and the inner side surface 421 are both flat surfaces, and the angle α between the first inclined surface 423a and the inner side surface 421 is from 120° to 170°, and the second inclined surface 423b and the inner side surface 421 are flat surfaces, with the angle β formed between the second inclined surfaces 423b and the inner side surface 421 being from 120° to 170°.

In an example, referring to FIGS. 7 and 8, a portion of the lower insulating member 42 corresponding to the first inclined surface 423a has a thickness that gradually decreases in a direction approaching the explosion-proof valve 43, and a portion of the lower insulating member 42 corresponding to the second inclined surface 423b has a thickness that gradually decreases in the direction approaching the explosion-proof valve 43. When the outer side surface 422 of the lower insulating member 42 comes into contact with the surface of the cap plate 41, since the thickness of the portion of the lower insulating member 42 corresponding to the first inclined surface 423a and the thickness of the portion of the lower insulating member 42 corresponding to the second inclined surface 423b gradually decrease, the space occupancy of the portion of the lower insulating member 42 corresponding to the first inclined surface 423a and the portion of the lower insulating member 42 corresponding to the second inclined surface 423b in the direction from the inner side surface 421 to the outer side surface 422 can be reduced, and the energy density of the secondary battery 10 can be improved.

In an example, as shown in FIG. 7, the cap plate 41 includes a liquid injection hole 411 for injecting electrolyte into the case 20. Along the axial direction X of the main body 31, the liquid injection hole 411 is located on a side of the explosion-proof valve 43 and on a side of the first inclined surface 423a. The region on the cap plate 41 located between the liquid injection hole 411 and the explosion-proof valve 43 corresponds to the first inclined surface 423a. The first insulating plate 424 of the lower insulating member 42 includes an through hole 428 disposed corresponding to the liquid injection hole 411. The first inclined surface 423a does not exceed an edge of the liquid injection hole 411 close to the explosion-proof valve 43.

Furthermore, the cap plate 41 includes a convex portion 412 protruding toward the lower insulating member 42. The liquid injection hole 411 penetrates the convex portion 412. The first insulating plate 424 includes a groove 427 recessed from the outer side surface 422 toward the inner side surface 421. The through hole 428 is in communication with the groove 427. The convex portion 412 of the cap plate 41 is inserted into the groove 427, and the liquid injection hole 411 is disposed corresponding to the through hole 428. The electrolyte is injected into the case 20 through the liquid injection hole 411 and the through hole 428. The first inclined surface 423a does not exceed an edge of the groove 427 close to the explosion-proof valve 43, and thus does not exceed an edge of the liquid injection hole 411 close to the explosion-proof valve 43. Since the first inclined surface 423a does not exceed the edge of the groove 427 close to the explosion-proof valve 43, the bottom of the groove 427 will not be thinned and accordingly the thickness of the bottom will not become too small, thereby reducing the possibility of fracture or deformation of the bottom due to external force.

In another example, the liquid injection hole 411 is located on a side of the explosion-proof valve 43 and on a side of the second inclined surface 423b. The second inclined surface 423b corresponds to the region on cap plate 41 located between the liquid injection hole 411 and the explosion-proof valve 43. The second insulating plate 425 of the lower insulating member 42 includes an through hole 428 disposed corresponding to the liquid injection hole 411. The second inclined surface 423b does not exceed an edge of the liquid injection hole 411 close to the explosion-proof valve 43. Furthermore, the cap plate 41 includes a convex portion 412 protruding toward the lower insulating member 42. The liquid injection hole 411 penetrates the convex portion 412. The second insulating plate 425 includes a groove 427 recessed from the outer side surface 422 toward the inner side surface 421. The through hole 428 is in communication with the groove 427. The convex portion 412 of the cap plate 41 is inserted into the groove 427, and the liquid injection hole 411 is disposed corresponding to the through hole 428. The second inclined surface 423b does not exceed an edge of the groove 427 close to the explosion-proof valve 43, and thus does not exceed an edge of the liquid injection hole 411 close to the explosion-proof valve 43. Since the second inclined surface 423b does not exceed the edge of the groove 427 close to the explosion-proof valve 43, the bottom of the groove 427 will not be thinned and accordingly the thickness of the bottom will not become too small, thereby reducing the possibility of fracture or deformation of the bottom due to external force.

An end of the first insulating plate 424 close to the second insulating plate 425 and an end of the second insulating plate 425 close to the first insulating plate 424 are both in a cantilevered state. In the present embodiment, the end of the first insulating plate 424 close to the second insulating plate 425 is connected and fixed to the cap plate 41, and the end of the second insulating plate 425 close to the first insulating plate 424 is connected and fixed to the cap plate 41. In this way, both the end of the first insulating plate 424 and the end of the second insulating plate 425 can be maintained in a stable position, and are not prone to sagging deformation. In an example, referring to FIGS. 7 and 8, a connecting column 430 is provided between the first insulating plate 424 and the cap plate 41, and a connecting column 430 is provided between the second insulating plate 425 and the cap plate 41. Both the first insulating plate 424 and the second insulating plate 425 are connected and fixed to the cap plate 41 by the connecting columns 430. In this way, the connecting column 430 does not need to penetrate the first insulating plate 424 or the second insulating plate 425, ensuring that the first inclined surface 423a or the second inclined surface 423b remains in a complete and flat state, and reducing the possibility of a shear structural damage to a partial region of the main body 31 due to excessive stress to the partial region of the main body 31 applied by the first inclined surface 423a and the second inclined surface 423b. In another example, a concave portion is provided on a surface of the cap plate 41 facing the electrode assembly 30. The connecting column 430 is at least partially inserted into the concave portion and is connected and fixed to the cap plate 41, thereby effectively improving the structural compactness of the cap plate 41 and the lower insulating member 42, reducing the total thickness of the both, improving the energy density of the secondary battery 10. In other examples, one of the end of the first insulating plate 424 close to the second insulating plate 425 and the end of the second insulating plate 425 close to the first insulating plate 424 is connected and fixed to the cap plate 41.

Figure 9:
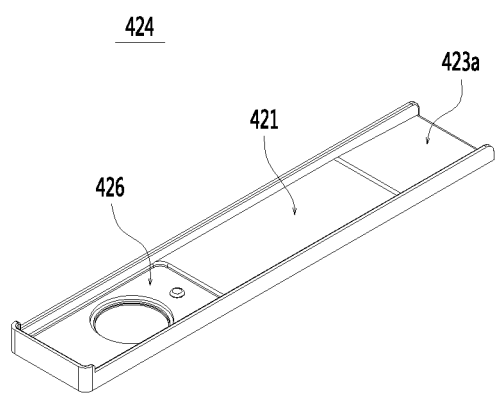
FIG. 9 is a schematic structural view of a first insulating plate according to an embodiment of the present disclosure.
Figure 10:
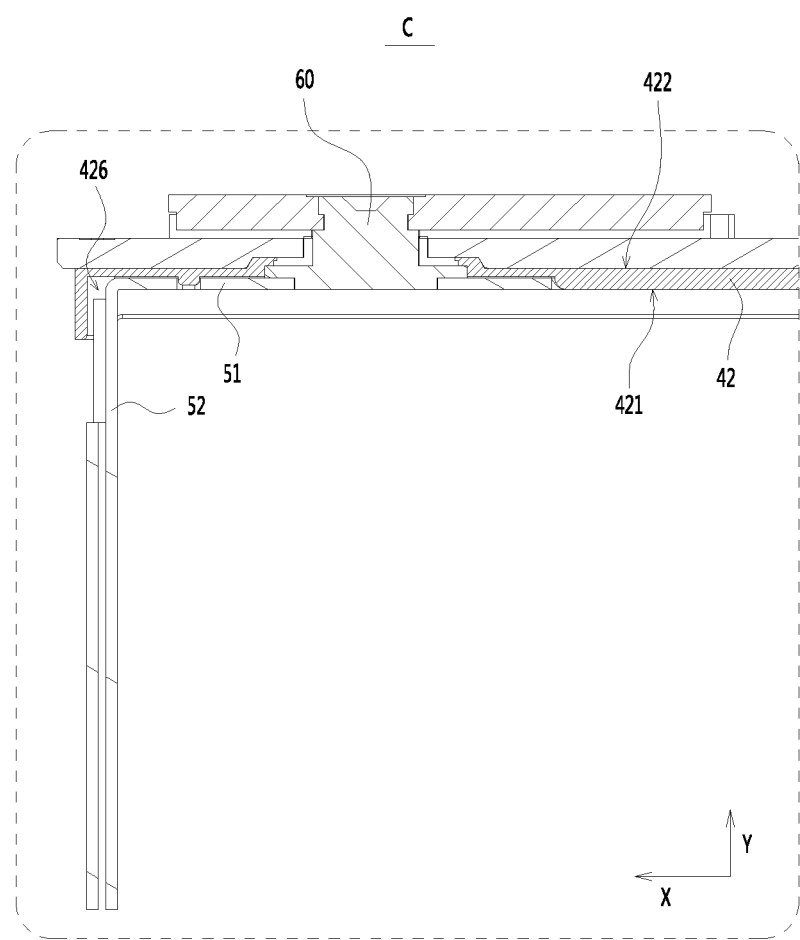
FIG. 10 is an enlarged view of portion C in FIG. 5.

Referring to FIGS. 9 and 10, the first insulating plate 424 of the lower insulating member 42 includes an accommodating portion 426 recessed from the inner side surface 421 to the outer side surface 422. The connecting portion 51 of the current collecting member 50 is accommodated in the accommodating portion 426 and connected to the electrode terminal 60. In this way, the structure of the lower insulating member 42 and the current collecting member 50 can be more compact, thereby reducing the space occupancy in the direction from the inner side surface 421 to the outer side surface 422, and increasing the energy density of the secondary battery 10. The connecting portion 51 of the current collecting member 50 and the electrode terminal 60 does not exceed the inner side surface 421 of the lower insulating member 42, thereby reducing the possibility of the shear structural damage to the corresponding region of the expanding main body 31 due to excessive shear stress to the corresponding region applied by the connecting portion 51 or the electrode terminal 60. In an example, the second insulating plate 424 of the lower insulating member 42 also includes an accommodating portion 426 recessed from the inner side surface 421 to the outer side surface 422.

Figure 6:
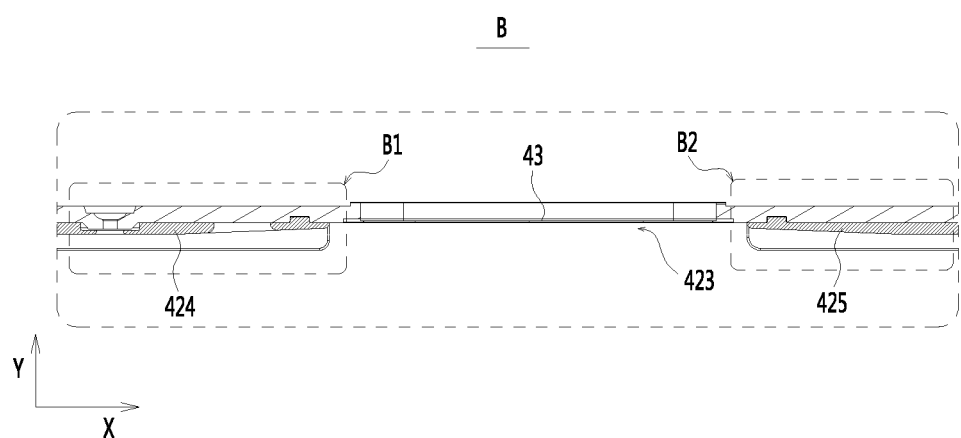
FIG. 6 is an enlarged view of portion B in FIG. 5.
Figure 11:
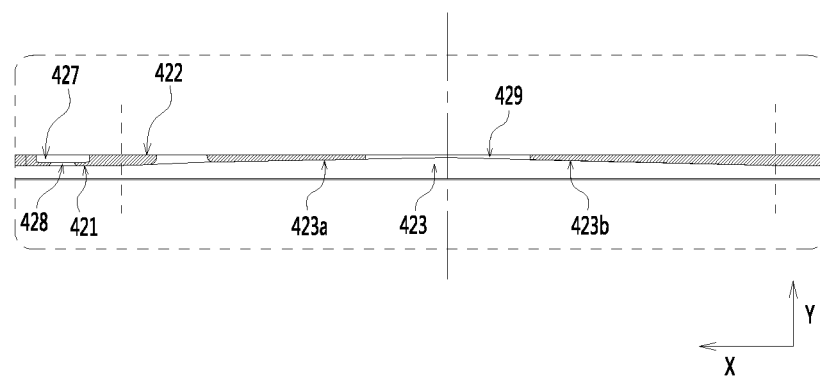
FIG. 11 is a schematic partial cross-sectional view of a lower insulating member according to another embodiment of the present disclosure.

The lower insulating member 42 of the embodiment shown in FIG. 11 has basically the same structure as the lower insulating member 42 of the embodiment shown in FIG. 6. Therefore, the main differences are mainly described here, and the same structure or the embodiments that may be combined are not repeated here.

Referring to FIG. 11, the lower insulating member 42 is formed of an integral structural body and includes an avoidance hole 429 that is in communication with the concave portion 423. The avoidance hole 429 is in position corresponding to the explosion-proof valve 43, so the lower insulating member 42 can avoid the explosion-proof valve 43 by the avoidance hole 429, ensuring that the airflow can smoothly pass through the avoidance hole 429 and can be discharged from the explosion-proof valve 43 when the pressure inside the secondary battery 10 is too high and even exceeds the preset burst stress of the explosion-proof valve 43. The avoidance hole 429 has a size larger than that of the mounting hole on the cap plate 41 and also larger than that of the explosion-proof valve 43. The escape hole 429 does not penetrate the lower insulating member 42 in its radial direction, so the first inclined surface 423a and the second inclined surface 423b are connected with each other in the axial direction X.

The first inclined surface 423a or the second inclined surface 423b is in arc transition with a hole wall of the avoidance hole 429. Therefore, the transition region between the first inclined surface 423a and the hole wall or the transition region between the second inclined surface 423b and the hole wall does not apply a relatively large shear stress to the main body 31 along the direction perpendicular to the axial direction X, effectively reducing the possibility of a shear structural damage to the main body 31 due to being squeezed by the transition region between the first inclined surface 423a and the hole wall or the transition region between the second inclined surface 423b and the hole wall. Preferably, the first inclined surface 423a and the second inclined surface 423b are in arc transition with the hole wall of the avoidance hole 429.

Since the lower insulating member 42 is formed of an integral structural body and has high structural strength, it can be connected and fixed with the cap plate 41 without using the connecting column 430 according to the foregoing embodiment, so in the direction from the inner side surface 421 to the outer side surface 422, the structure between the lower insulating member 42 and the cap plate 41 can be more compact, and the lower insulating member 42 and the cap plate 41 can have relatively simple structures, reducing the difficulty in processing and manufacturing.

During use of the secondary battery 10 according to the embodiment of the present disclosure, the main body 31 of the electrode assembly 30 may expand. In the embodiment of the present disclosure, since the lower insulating member 42 disposed adjacent to the main body 31 includes the concave portion 423 for buffering the expansion of the main body 31, the expanding main body 31 will not directly squeeze the region on the lower insulating member 42 corresponding to the explosion-proof valve 43. In this way, the expanding main body 31 will not come into contact with the region on the lower insulating member 42 where the concave portion 423 is disposed or will not exert a relatively large compressive stress on this region. Therefore, the possibility of deformation of the lower insulating member 42 due to being squeezed by the expanding main body 31 can be reduced, and the possibility of affecting the original preset burst pressure of the explosion-proof valve 43 due to the deformation of the lower insulating member 42 to squeeze the explosion-proof valve 43 can be reduced, and the safety of the secondary battery 10 in use can be improved.

Although the present disclosure has been described with reference to the preferred embodiments, various modifications may be made thereto and components thereof may be replaced with equivalents without departing from the scope of the present disclosure. In particular, as long as there is no structural conflict, the technical features mentioned in the embodiments can be combined in any manner. The present disclosure is not limited to the specific embodiments disclosed herein, but includes all technical solutions that fall within the scope of the claims.

What is claimed is:

1. A secondary battery comprising:
   a case comprising an opening;
   an electrode assembly disposed within the case, the electrode assembly comprising a main body and two tabs, the two tabs respectively extending outwards from both sides of the main body in an axial direction of the main body, the two tabs being both disposed facing the case; and
   a cap assembly comprising a cap plate, electrode terminals connected to the cap plate, a lower insulating member and an explosion-proof valve, the cap plate sealing the opening, the explosion-proof valve being disposed on the cap plate, the lower insulating member being disposed on a side of the cap plate close to the electrode assembly, the lower insulating member comprising an inner side surface facing the main body, an outer side surface facing the cap plate, and a concave portion recessed from the inner side surface toward the outer side surface, the concave portion being disposed adjacent to the explosion-proof valve in a thickness direction of the cap plate, and the concave portion being used to buffer expansion and deformation of the main body,
   wherein the concave portion comprises a first inclined surface and a second inclined surface which are distributed along the axial direction, the first inclined surface and the second inclined surface are both inclined from the inner side surface toward the outer side surface, the explosion-proof valve is located between the first inclined surface and the second inclined surface, and the first inclined surface and the second inclined surface become close to each other in a direction from the inner side surface to the outer side surface; and
   wherein the cap plate comprises a liquid injection hole, and the liquid injection hole is located between one of the electrode terminals and the explosion-proof valve in the axial direction, the first inclined surface or the second inclined surface is located between the liquid injection hole and the explosion-proof valve in the axial direction, and an extension length of at least one of the first inclined surface and the second inclined surface in the axial direction is larger than a half of a distance between the liquid injection hole and the explosion-proof valve in the axial direction.

2. The secondary battery according to claim 1, wherein an arc surface is formed between the first inclined surface and the inner side surface; and/or, an arc surface is formed between the second inclined surface and the inner side surface.

3. The secondary battery according to claim 1, wherein the first inclined surface and the second inclined surface are symmetrically disposed along an axis of the concave portion.

4. The secondary battery according to claim 1, wherein a portion of the lower insulating member corresponding to the first inclined surface has a thickness that gradually decreases, in a direction approaching the explosion-proof valve; and/or, a portion of the lower insulating member corresponding to the second inclined surface has a thickness that gradually decreases, in the direction approaching the explosion-proof valve.

5. The secondary battery according to claim 1, wherein the lower insulating member comprises a first insulating plate and a second insulating plate which are spaced apart from each other along the axial direction, the first inclined surface is disposed on the first insulating plate, the first inclined surface connects a first end surface of the first insulating plate facing the second insulating plate with the inner side surface, the second inclined surface is disposed on the second insulating plate, the second inclined surface connects a second end surface of the second insulating plate facing the first insulating plate with the inner side surface, an avoidance gap that is in communication with the concave portion is formed between the first end surface and the second end surface.

6. The secondary battery according to claim 5, wherein a connecting column is provided between the first insulating plate and the cap plate, the first insulating plate is connected and fixed to the cap plate by the connecting column; and/or, the connecting column is provided between the second insulating plate and the cap plate, and the second insulating plate is connected and fixed to the cap plate by the connecting column.

7. The secondary battery according to claim 1, wherein the lower insulating member is formed of an integral structural body and comprises an avoidance hole that is in communication with the concave portion, the avoidance hole is disposed adjacent to the explosion-proof valve in the thickness direction of the cap plate, the first inclined surface and the second inclined surface are connected along the axial direction.

8. The secondary battery according to claim 1, wherein the first inclined surface and the inner side surface are both flat surfaces, and an angle formed between the first inclined surface and the inner side surface is from 120° to 170°; and/or, the second inclined surface and the inner side surface are flat surfaces, and an angle formed between the second inclined surface and the inner side surface is from 120° to 170°.

9. The secondary battery according to claim 1, wherein the first inclined surface or the second inclined surface does not overlap an edge of the liquid injection hole close to the explosion-proof valve.

10. The secondary battery according to claim 9, wherein the liquid injection hole and the explosion-proof valve are located on two opposite sides of the first inclined surface or the second inclined surface along the axial direction, respectively.

11. The secondary battery according to claim 1, wherein the cap plate comprises a convex portion protruding toward the lower insulating member, the injection hole penetrates the convex portion, and the lower insulating member comprises a groove recessed from the outer side surface toward the inner side surface and a through hole that is in communication with the groove, the convex portion is inserted into the groove, and the liquid injection hole is disposed corresponding to the through hole, and the first inclined surface or the second inclined surface does not overlap an edge of the groove close to the explosion-proof valve.

12. The secondary battery according to claim 11, wherein the groove and the explosion-proof valve are located on two opposite sides of the first inclined surface or the second inclined surface along the axial direction, respectively.

* * * * *